Feb. 19, 1963   L. B. GRANTHAM ETAL   3,077,745
LIQUID PETROLEUM GAS CONVERTER
Filed Aug. 24, 1959   4 Sheets-Sheet 1

INVENTORS
R.A. MENGELKAMP
L.B. GRANTHAM
BY Hudson and Young
ATTORNEYS

AIR TYPE LP-GAS CONVERTER PERFORMANCE VS HOT WATER LP-GAS CONVERTER PERFORMANCE FAGEOL TC 200-65 ENGINE 9.25:1 CR.....BEST POWER SPARK ADVANCE AND AIR-FUEL RATIO

AIR TYPE LP-GAS CONVERTER PERFORMANCE VS HOT
WATER LP-GAS CONVERTER PERFORMANCE
FAGEOL TC 200-65 ENGINE

*INVENTORS*
R.A. MENGELKAMP
L.B. GRANTHAM

BY *Hudson and Young*

*ATTORNEYS*

U n i t e d   S t a t e s   P a t e n t   O f f i c e 3,077,745
Patented Feb. 19, 1963

3,077,745
LIQUID PETROLEUM GAS CONVERTER
Lloyd B. Grantham and Richard A. Mengelkamp, Bartlesville, Okla., assignors to Phillips Petroleum Company, a corporation of Delaware
Filed Aug. 24, 1959, Ser. No. 835,695
7 Claims. (Cl. 62—52)

This invention relates to vaporizers for converting liquefied petroleum gases into vapor form. In one of its aspects this invention relates to an apparatus for the vaporization of liquefied petroleum gas for fuel in a combustion system such as a reciprocating or continuous internal combustion engine. In still another aspect this invention relates to a simplified apparatus for vaporizing liquefied petroleum gas whereby all of the heat required for vaporization of the hydrocarbon is derived from the air used for combustion.

Liquid hydrocarbon gases, like butane and propane, have been found to be satisfactory fuels in reciprocating internal combustion engines, including both normally aspirated and supercharged engines. This fuel is liquefied by compression and stored and carried in the liquid state under pressure and is converted to the vapor state before use in the engine. The conversion of the fuel from the liquid state is usually effected by means of heat supplied to the liquid fuel in the heat-exchange device, although a partial vaporization of the fuel is accomplished by passage of the fuel through a pressure-reduction stage such as a pressure-reducing valve. The expansion of the fuels through a pressure-reducing valve results in the absorption of a large quantity of heat. Since the liquid fuel is seldom pure and contains water in very small amounts, ice often accumulates in the pressure-reducing valve, unless heat is supplied at this point, and interferes with the expansion process. Various devices have been proposed for a vaporization of liquefied petroleum gases; however, invariably the heat required for the vaporization of the liquid fuel after the pressure-reduction step is supplied in a heat-exchange apparatus using, for example, the hot cooling water circulated through the engine.

The present liquefied petroleum gas converter is an improvement over that described in our Patent No. 2,821,843, issued February 4, 1958, in that no heating fluid other than the air used for combustion is required to supply the heat necessary to vaporize the liquefied hydrocarbon gas.

It is an object of the present invention to provide a liquefied petroleum gas converter for use throughout a wide range of ambient air temperatures without requiring an auxiliary heating fluid other than the air used for combustion.

It is another object of the invention to provide a liquefied gas converter wherein the pressure on the gas is reduced through a plurality of pressure-reduction valves arranged either in parallel or in series.

It is still another object of this invention to provide a liquefied gas converter for use with an internal combustion engine wherein the vaporized gas and the air used for combustion are supplied to the carburetion device at approximately the same temperature.

It is also an object of the invention to provide a means to reduce the temperature of the fuel and air introduced into the engine so as to increase volumetric efficiency and to reduce knock.

Still another object of this invention is to provide a liquefied gas converter wherein at least a portion of the water of condensation is utilized for providing extra power during periods of acceleration.

Other objects and advantages will be apparent to one skilled in the art upon reading the disclosure of this invention, including the attached drawing, wherein like elements are referred to by like numerals in the various figures.

The present invention provides an efficient, compact and simple apparatus for the conversion of liquid hydrocarbon fuels such as methane, ethane, ethylene, propane, propylene, butylenes, and butane into gases for use as fuel in reciprocating, internal-combustion engines, and the heat absorbed in the vaporization process provides cooling of the air supplied to the engine for combustion so that the volumetric efficiency of the engine is increased, with a corresponding decrease in the octane requirement of the engine. It has heretofore been considered necessary to supply at least a portion of the heat required to vaporize the liquefied hydrocarbon gas in the form of a heat-supplying liquid; however, we have found that all of the required heat can be obtained from the air to be utilized for combustion provided the proper relationship of gas expansion and heat exchange of expanding gases with incoming air is maintained.

Figure 1:
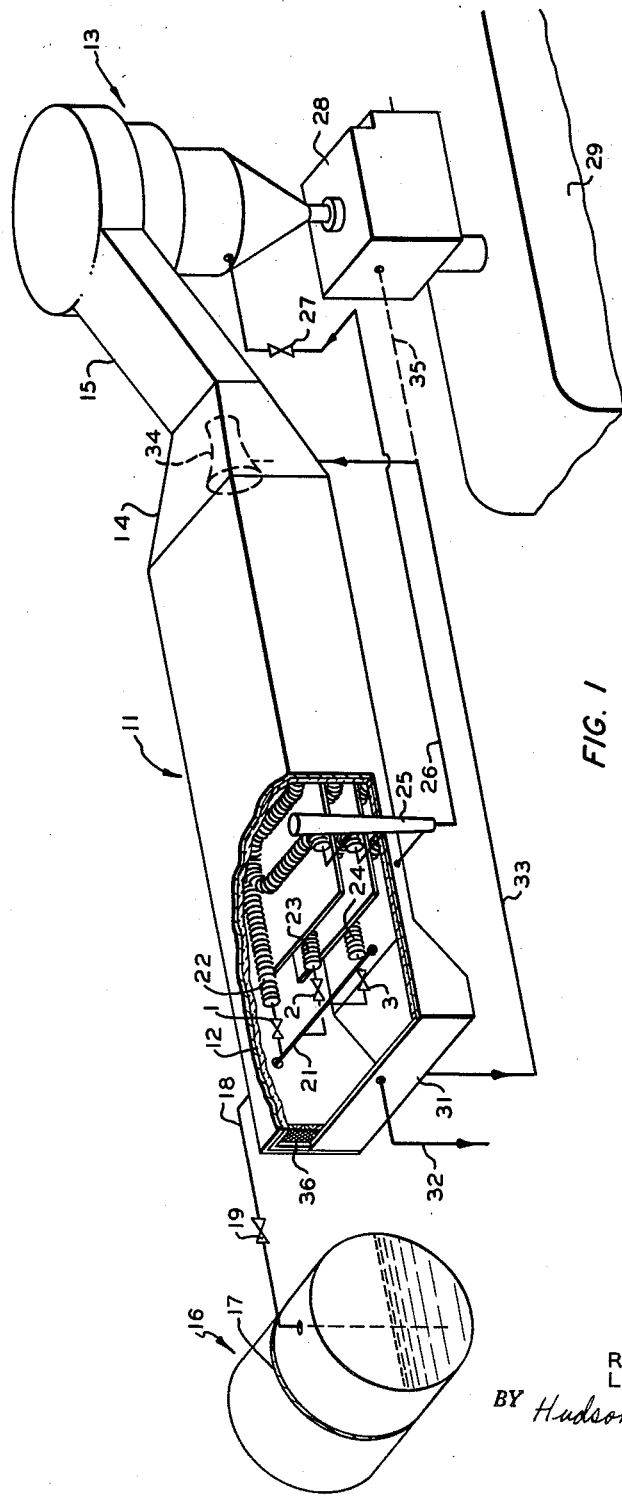
FIGURE 1 is a schematic illustration, partly in section, of the converter of the invention connected to a conventional internal combustion automotive engine.

Referring now to FIGURE 1 of the drawing, 11 indicates the converter covered by the insulated housing 12 and connected to a conventional automotive carburetor by an adapter 13 by means of conduit sections 14 and 15. Fuel tank 16 is shown covered by insulation 17 and supplies liquefied hydrocarbon fuel via conduit 18 containing valve 19 to manifold 21 in the converter 11. High pressure expansion valve 1 passes fuel from manifold 21 to heat-exchange conduit 22; high pressure expansion valve 2 passes fuel from manifold 21 to heat-exchange conduit 23; and high pressure expansion valve 3 passes fuel from manifold 21 to heat-exchange conduit 24. Heat-exchange conduits 22, 23 and 24 are connected at outlet ends with outlet manifold 25. The gases are conveyed from outlet manifold 25 through conduit 26 containing demand regulator 27 to the adapter 13 wherein partial mixing of the air and gases occurs prior to entry to the carburetor 28 which is connected to engine 29. Water condensed from the atmosphere as a result of heat exchange with the heat-exchange conduits 22, 23 and 24 collects in sump 31 having overflow line 32; the condensate sump or trap 31 is connected by means of line 33 to a venturi 34 positioned in conduit 14. Alternatively, the water line 33 can be connected to the venturi of carburetor 28 by line 35. Air enters the converter through filter 36.

Figure 2:
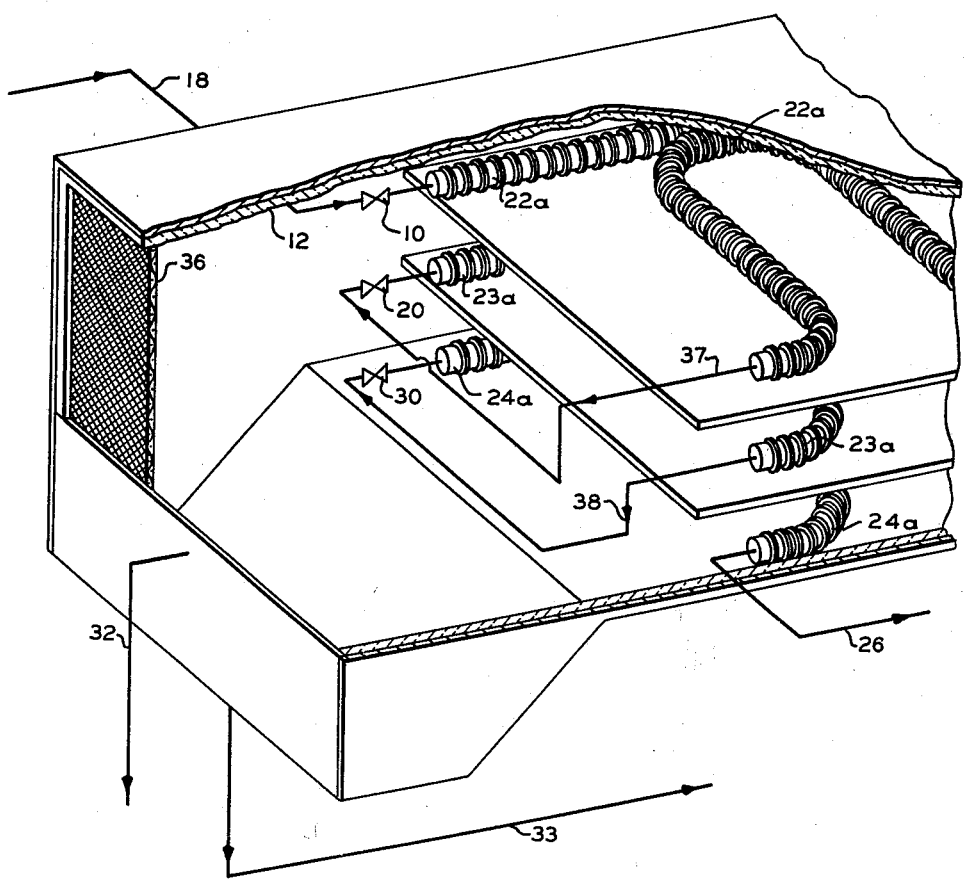
FIGURE 2 is a partial, sectional view of a portion of the expansion sections of a modification of the device shown in FIGURE 1.

Referring now to FIGURE 2, the liquefied hydrocarbon gas enters the converter via conduit 18 and is passed through the first expansion valve 10 to the heat-exchange conduit 22a and the outlet of heat-exchange tube 22a is connected via conduit 37 to the second expansion valve 20 through which the hydrocarbon is passed to heat-exchange conduit 23a. The outlet of heat-exchange conduit 23a is connected by means of conduit 38 through the third expansion valve 30 to the inlet of heat-exchange conduit 24a. The outlet of heat-exchange conduit 24a is connected directly to line 26 which carries the gas through demand regulator 27 of FIGURE 1 to the adapter 13 of FIGURE 1 and then to the carburetor or intake manifold of the engine.

The operation of the preferred embodiment of the invention as illustrated in FIGURE 1 will now be described. The liquefied petroleum gas passes through conduit 18 to expansion valve 1 at the prevailing atmospheric temperature and at a pressure of the liquefied hydrocarbon at that temperature. The liquefied hydrocarbon is simultaneously supplied to expansion valves 2 and 3 under the same conditions. Assuming the air temperature to be 80 degrees, reference to the vapor pressure chart shows that the vapor pressure of propane at 80 degrees is about 140 pounds per square inch absolute. The expansion valves 1, 2 and 3 can all be set at the same outlet pressure, although it is generally preferred to vary the outlet pressures of the three valves. We have found that a pressure range of about 5 pounds to about 20 pounds per square inch gauge in the heat-exchange conduits 22, 23 and 24 is satisfactory from idling conditions to high speed conditions of an automotive engine. We have set all expansion valves at 5 p.s.i.g. downstream pressure and all at various downstream pressures up to 20 p.s.i.g. Demand regulator 27 supplies gas to the engine carburetor or intake manifold at substantially atmospheric pressure regardless of the pressure in the heat-exchange conduits in the range of 5 to 20 p.s.i.g.

The incoming air enters the coil system through the filter so as to contact the expansion valves first and then the leading portion of the heat-exchange conduit. The convolutions or undulations of the heat-exchange conduits are such that the outlet ends of the heat-exchange conduits are also contacted by the incoming air just downstream from the filters so that both ends of the heat-exchange conduits are contacted with air at substantially ambient temperature. Thus, the flow of gas starts cold through the heat-exchange conduit but is superheated at the heat-exchange conduit outlet at the prevailing pressure in the heat-exchange conduits. The heat-exchange conduits which comprise the finned tubing traverse the converter from the front (air inlet end) to the rear of the converter and then return by means of a series of undulations to the front so that the incoming air simultaneously contacts the inlets and outlets of the finned tubing of the heat exchanger. The air flow and the gas flow are, for the most part, in opposite directions so as to obtain maximum heat exchange between the air and the gas. It can be seen that the combustion air and the gas enter the carburetor at substantially the same temperature. We have determined that the combustion air entering the carburetor can be as much as 50° F. cooler than the temperature of air with a hot-water type converter.

The condensate trap 31 will normally contain water, the excess being disposed of through overflow conduit 32, so that when extra power is required for acceleration, for example, after a period of idling operation by the motor, a quantity of water is available for induction into the carburetor through line 33 and venturi 34. An example of the advantage gained by this feature of the invention is in the operation of a metropolitan bus where stops are periodically made for passengers to embark or disembark and maximum power is desired in restarting the bus. During these periods of acceleration it is advantageous to inject water into the carburetor to suppress knock and to increase volumetric efficiency.

The operation of the modification shown in FIGURE 2 is similar to that of FIGURE 1 except that the pressure is reduced in expansion valve 10 to a first value, for example about 100 p.s.i.g., is then reduced in expansion valve 20 to a lower value, for example 50 p.s.i.g., and then is again reduced in expansion valve 30 to a third value, such as about 5 p.s.i.g. Inlet manifold 21 and outlet manifold 25 are not utilized in this modification of the invention. The modification of FIGURE 2 is often advantageous in situations where high humidity or low temperatures are commonly encountered.

The filter 36 can be any filtering material such as those used in air conditioning systems, and in furnace ducts such as matting of cellulosic fibers or Fiberglas, and is advantageously adapted for removal for cleaning or for replacement.

The expansion valves 1, 2, 3, 10, 20 and 30 are conventional diaphragm-operated orifice valves such as a Detroit single diaphragm automatic expansion valve, illustrated on page 38 as Valve No. 672 in the Harry Alter Co. Catalogue No. 169 (1958), Harry Alter Co., Dallas 7, Texas.

The demand regulator valve 27 is a conventional single diaphragm regulator valve obtainable on the market, such as the Algas atmospheric regulators, Model 880A, or Model 1290, available from the American Liquid Gas Corporation, Los Angeles, California. The demand regulator can be any gas regulator which will supply gas at the engine intake manifold pressure, e.g., one-half inch column of water, from a regulator inlet pressure of about 0.5 pound to about 5 pounds. The regulator should have a positive shut-off feature to avoid leakage of gas when the engine is not operating.

The superior performance of the converter of this invention is illustrated by the following examples wherein runs were made with the air-type converter of the invention and a conventional hot water-type converter available on the market. It is to be understood that the examples are for the purpose of illustration of the invention, and are not to be construed as limiting the invention.

*Example I*

A Fageol TC 200-65 engine was mounted on a test block and directly connected to a General Electric dynamometer. Runs were made according to the procedure outlined in the Diesel and Gasoline Test Codes of the 1956 SAE Handbook, published by the Society of Automotive Engineers; see page 920 et seq.

Figure 3:
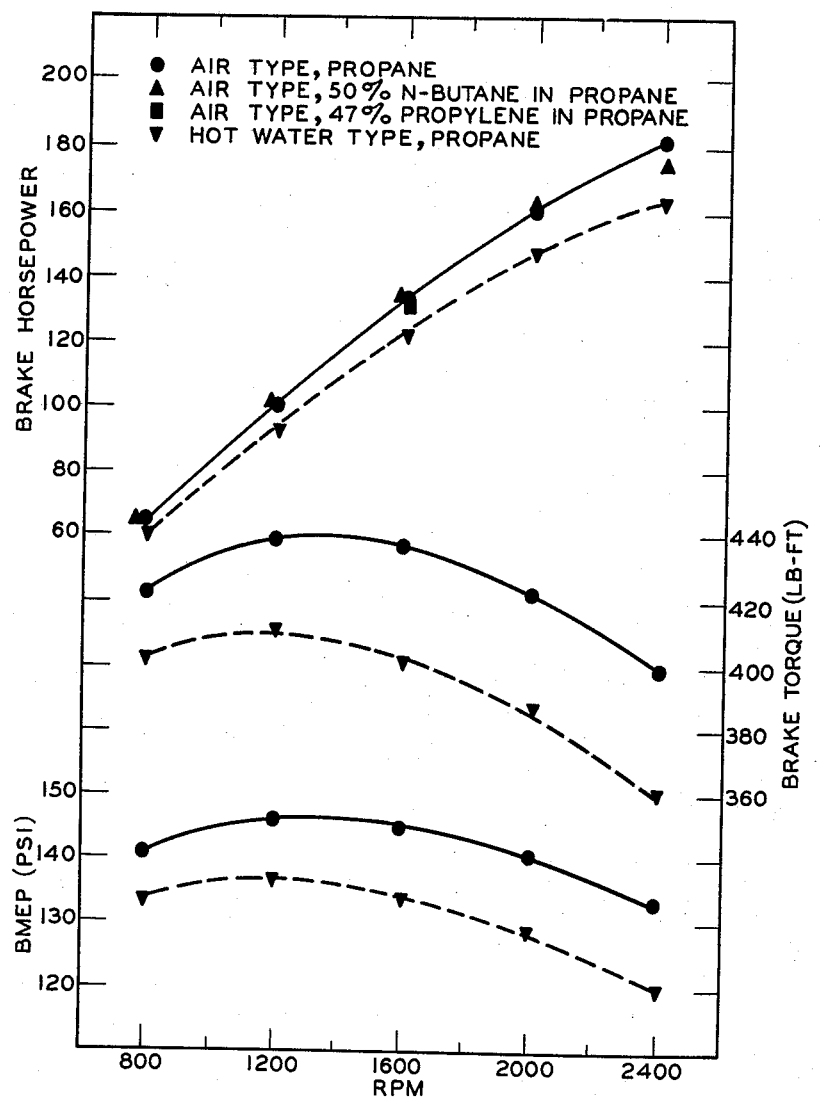
FIGURE 3 shows the brake horsepower, brake torque, and brake mean effective pressure results achieved with a Fageol TC 200-65 test engine operated in conjunction with the air-type converter of this invention.
Figure 4:
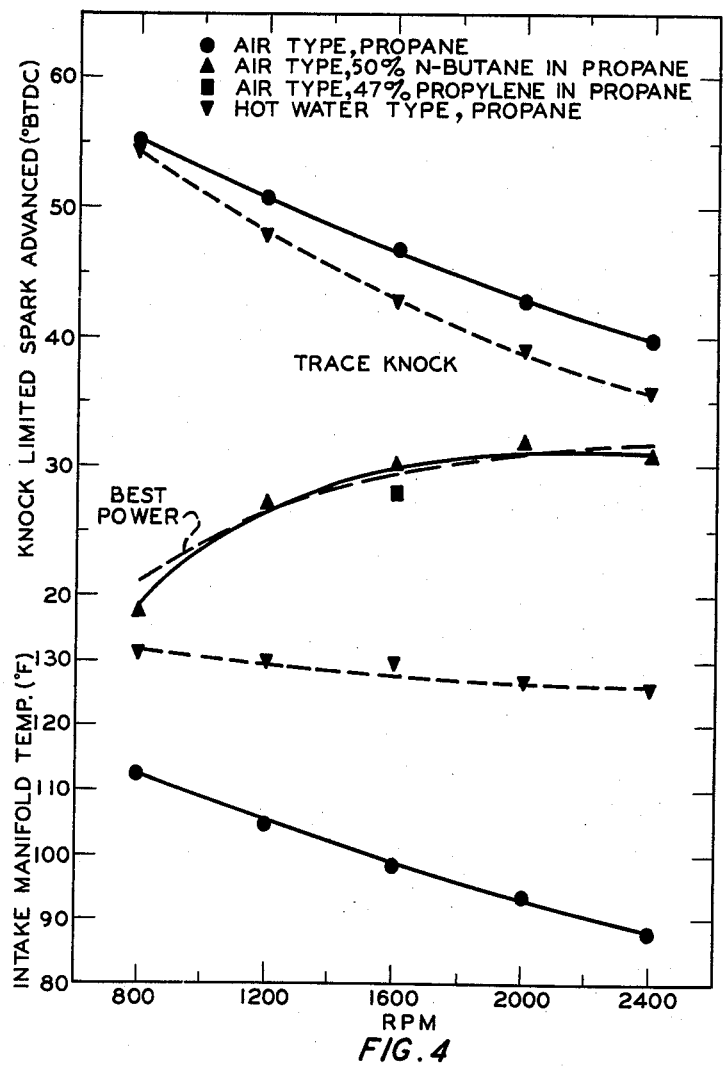
FIGURE 4 shows the knock limited spark advance data and intake manifold temperature data taken during test runs of a Fageol TC 200-65 engine operated in conjunction with the air-type converter of this invention.

The results of runs using representative L.P. gas fuels are shown in FIGURES 3 and 4. FIGURE 3 shows that knock limited brake horsepower, brake torque and brake mean effective pressure gains with the air-type converter of this invention exceed by 10 to 11 percent the values obtained with the conventional hot water converter at 2400 r.p.m.-full load conditions. Note that the converter of this invention is superior to the hot water-type converter not only for 100 percent propane but also for propane blends containing 50 percent normal butane and 47 percent propylene, respectively. These runs indicate that in engines rated at 3200 to 3600 r.p.m., higher gains would be obtained. A fuel leak prevented accurate measurements of brake specific fuel consumption; however, a reduction of at least 2 percent in specific fuel consumption was indicated by the test.

Knock limited spark advance data and intake manifold temperature data are shown in FIGURE 4. A four degree increase in knock limited spark advance is shown with propane at 2400 r.p.m.; and reference to FIGURE 3 shows that this occurred with a 13 p.s.i. higher brake mean effective pressure which is surprising and is believed due to the 38 degree reduction in intake manifold temperature with the air-type converter of the invention.

*Example II*

A 1958 Ford car equipped with a 300 horsepower Thunderbird engine and an air-type L.P. gas converter of this invention has been field tested under winter and summer driving conditions without a single instance of engine stalling due to ice accumulations in the pressure reducing valves. Knock and acceleration characteristics of the Ford with the air-type converter were superior to those obtained with a conventional hot water type converter, for example an increase of 104.2 as compared to 101.8 in octane number and a 16 percent increase in fourth gear acceleration characteristics were achieved using propane.

The tests of Example I were made with the expansion valves connected in parallel, as shown in FIGURE 1, and also in series as in FIGURE 2, whereas the tests made with the Ford automobile were made with the expansion valves connected in parallel, as in FIGURE 1.

In the converter used in Examples I and II, the expansion valves corresponding to numerals 1, 2 and 3 of FIGURE 1, and numerals 10, 20 and 30 of FIGURE 2, contained orifices of 7/32 inch, 5/64 inch, and 3/32 inch, respectively. About 14 feet of 5/16-inch copper tubing was used in each tier of coils extending from the expansion valves to the discharge manifold 25. The demand regulator 27 had a 3/8-inch orifice on the pressure side.

A number of advantages result from the air-type converter of this invention such as the simplification of the device by deriving all of the heat, required to vaporize the liquefied petroleum gas, from the air which is to be used in the combustion of the gas. Another advantage is that the correct amount of air for vaporization of the gas is automatically supplied due to the fact that the fuel air ratio is set by the design and adjustments of the carburetor so that, as more fuel is supplied to the engine with the increase in the amount of liquefied petroleum gas to be vaporized, the amount of air passing to the engine through the converter is similarly increased. Thus, the fuel and the air are supplied to the carburetor at substantially the same temperature at low engine speeds as at high engine speeds.

Calculations based on the physical properties of propane, one of the more volatile of the liquefied petroleum gases, indicate that from about 25 to 90 square inches of heat-exchange surface per engine horsepower will provide adequate vaporization of propane under the most critical conditions. Thus, for normal automotive driving conditions, a heat-exchange surface of less than the indicated range will be satisfactory whereas under certain uses in areas of extremely high humidity or extremely low temperature, more heat-exchange surface than that of the indicated range may be required.

It is preferred that the housing of the converter be insulated so as to avoid raising the temperature of the air passing to the carburetor or intake manifold because it is a feature of the invention that the heat extracted from the air to vaporize the liquefied petroleum gas results in lowering the temperature of the gas and air mixture admitted to the intake manifold in the engine. Air can be taken from outside or inside of the engine housing.

The description of the invention has been directed to incorporating the converter into a conventional automotive engine and the adapter 13 can be any means for passing the air and fuel to the existing carburetor of the engine. The converter is also applicable for use in diesel engines and in gas turbine engines or any other combustion apparatus wherein hydrocarbon gas and air are burned to produce heat and/or pressure.

It will be evident to those skilled in the art that reasonable variations and modifications are possible within the scope of this disclosure without departing from the spirit and scope of the invention.

That which is claimed is:

1. The method of operating an internal combustion automotive engine with a liquefied petroleum gas which comprises expanding said liquefied petroleum gas through a plurality of pressure reducing zones into a zone of reduced pressure maintained at a pressure in the range of about 5 p.s.i.g. to about 20 p.s.i.g. to vaporize said liquefied petroleum gas; passing an amount of atmospheric air required to operate said internal combustion engine in indirect heat exchange with said pressure reducing zones and with said zone of reduced pressure as the sole heat supply for said petroleum gas and then directly into said internal combustion engine; passing vaporized petroleum gas from said zone of reduced pressure to said internal combustion engine; passing water of condensation to said internal combustion engine during periods of acceleration.

2. A liquefied petroleum gas converter adapted to be connected to the engine of an automotive vehicle comprising a housing having an atmospheric air inlet in one end and an air outlet in the other end; a plurality of pressure-reducing valves in the air inlet end of said housing; means to supply liquefied petroleum gas to said pressure-reducing valves; a carburetor; a regulator valve to supply gas to said carburetor; a heat-exchange conduit connected to each of said pressure-reducing valves, positioned in said housing and presenting sufficient heat-exchange surface to the air in said housing to vaporize liquefied petroleum gas passing through each of said pressure-reducing valve; conduit means connecting said air outlet and said carburetor so that all of the air entering said air inlet passes to said carburetor as the sole heat supply for vaporizing said liquefied petroleum gas because of the lesser pressure in said carburetor than at said inlet; a reservoir having an overflow means connected to said housing to collect water condensed from the air passing through said housing; means operatively connected to said reservoir and said carburetor to pass water from said reservoir to said carburetor when said engine is operating; and means to pass vaporized petroleum gas from said heat exchange conduit to said regulator valve.

3. A liquefied petroleum gas converter for supplying vaporized petroleum gas to a combustion process comprising a housing having an air inlet in one end in direct communication with the atmosphere and an air outlet in the other end; a plurality of pressure-reducing valves in the air inlet end of said housing; means to supply liquefied petroleum gas to said pressure-reducing valves; a carburetor; a regulator valve to supply gas to said carburetor; a heat-exchange conduit connected to each of said pressure-reducing valves and positioned in said housing so as to pass gas from said pressure-reducing valves to the outlet end of said housing and thence back to the inlet end of said housing in a series of undulations in indirect heat exchange with the air in said housing; conduit means connected to said air outlet and to said carburetor so that all of the air which enters said air inlet passes to said carburetor because of the difference in pressure in said carburetor and at said air inlet and so that the air which passes through said housing is the sole source of heat supplied to vaporize said liquefied petroleum gas and is the sole source of heat supplied to the mixture of gas and air passing to said carburetor; means to pass gas from said heat-exchange conduit to said regulator valve; a reservoir having an overflow means connected to said housing to collect water condensed from the air passing through said housing; and means operatively connected to said reservoir and said carburetor to pass water from said reservoir to said carburetor when said combustion process is operating.

4. A liquified petroleum gas converter for use with an internal combustion engine comprising a housing having an atmospheric air inlet in one end and an air outlet in the other end; a plurality of pressure-reducing valves in the air inlet end of said housing; means to supply liquified petroleum gas to said pressure-reducing valves; a carburetor; a regulator valve to supply gas to said carburetor; a heat-exchange conduit connected to each of said pressure-reducing valves and positioned in said housing so as to present from 25 to 90 square inches of heat-exchange surface per engine horsepower to the air in said housing; conduit means connected to said air outlet and to said carburetor so that all of the air which enters said air inlet passes to said carburetor because of the difference in pressure in said carburetor and at said air inlet and so that the air which passes through said housing is the sole source of heat supplied to vaporize said liquefied petroleum gas and is the sole source of heat supplied to the mixture of gas and air passing to said carburetor; means to pass gas from said heat exchange conduit to said regulator valve; a reservoir having an overflow means connected to said housing to collect water condensed from the air passing through said housing; and means operatively connected to said reservoir and said carburetor to pass water from said reservoir to said carburetor when said engine is operating.

5. A liquefied petroleum gas converter adapted to be connected to the engine of an automotive vehicle comprising a housing having an atmospheric air inlet at one end and an air outlet in the other end; a carburetor; a regulator valve to supply gas to said carburetor; a plurality of heat-exchange conduits positioned in said housing and presenting sufficient heat-exchange surface to the air in said housing to vaporize liquefied petroleum gas passing through said heat-exchange conduits; a plurality of pressure-reducing valves set at successively lower outlet pressures and positioned in the air inlet end of said housing, one of said pressure-reducing valves being connected to the inlet of one of said heat-exchange conduits and the remaining pressure-reducing valves being connected to the inlets and outlets of the remaining heat-exchange conduits so as to pass gas at successively lower pressures through said pressure-reducing valves; means to supply liquefied petroleum gas to said pressure-reducing valves; means to pass the vaporized gas from said heat-exchange conduits to said regulator valve; and conduit means connecting said air outlet and said carburetor so that all of the air entering said air inlet passes to said carburetor as the sole heat supply for vaporizing said liquefied petroleum gas because of the lesser pressure in said carburetor than at said inlet.

6. A liquefied petroleum gas converter for supplying vaporized petroleum gas to a combustion process comprising a housing having an air inlet in one end in direct communication with the atmosphere and an air outlet in the other end; a plurality of pressure-reducing valves set at successively lower outlet pressures and positioned in the air inlet end of said housing; means to supply liquefied petroleum gas to the pressure-reducing valve having the highest outlet pressure; a carburetor; a regulator valve to supply gas to said carburetor; a heat exchange conduit connected to each of said pressure-reducing valves and positioned in said housing so as to pass gas at successively lower pressures from said pressure-reducing valve having the highest outlet pressure to the outlet end of said housing and thence back to the inlet end of said housing in a series of undulations in indirect heat exchange with the air in said housing; conduit means connected to said air outlet and to said carburetor so that all of the air which enters said air inlet passes to said carburetor because of the difference in pressure in the carburetor and at said air inlet and so that the air which passes through said housing is the sole source of heat supplied to vaporize said liquefied petroleum gas and is the sole source of heat supplied to the mixture of gas and air passing to said carburetor; and means to pass gas from said heat-exchange conduit to said regulator valve.

7. A liquefied petroleum gas converter for use with an internal combustion engine comprising a housing having an atmospheric air inlet in one end and an air outlet in the other end; a plurality of pressure-reducing valves set at successively lower outlet pressures and positioned in the air inlet of said housing; means to supply liquefied petroleum gas to the pressure-reducing valve having the highest outlet pressure; a carburetor; a regulator valve to supply gas to said carburetor; a plurality of heat-exchange conduits connected to said pressure-reducing valves so that the liquefied petroleum gas passes through said conduits at successively lower pressures and is vaporized therein, said heat-exchange conduits being positioned in said housing so as to present from 25 to 90 square inches of heat-exchange surface per engine horsepower to the air in said housing; conduit means connected to said air outlet and to said carburetor so that all of the air which enters said air inlet passes to said carburetor because of the difference in pressure in said carburetor and at said air inlet and so that the air which passes through said housing is the sole source of heat supplied to vaporize said liquefied petroleum gas and is the sole source of heat supplied to the mixture of gas an air passing to said carburetor; and means to pass gas from said heat-exchange conduit to said regulator valve.

References Cited in the file of this patent
UNITED STATES PATENTS

| | | |
|---|---|---|
| 1,889,162 | Thomas et al. | Nov. 29, 1932 |
| 2,272,341 | Holzapfel | Feb. 10, 1942 |
| 2,296,790 | Jones | Sept. 22, 1942 |
| 2,319,971 | Bodine | May 25, 1943 |
| 2,821,843 | Mengelkamp et al. | Feb. 4, 1958 |
| 2,823,521 | Enger et al. | Feb. 18, 1958 |
| 2,833,121 | Dorf | May 6, 1958 |
| 2,938,358 | Newton et al. | May 31, 1960 |